US005201946A

United States Patent [19]

Marsek

[11] Patent Number: 5,201,946

[45] **Date of Patent: * Apr. 13, 1993**

[54] LIQUID SPRAY MASK AND METHOD

[76] Inventor: Patrick W. Marsek, 408 Tanglewood Ct., Vernon Hills, Ill. 60061

[ * ] Notice: The portion of the term of this patent subsequent to Jul. 2, 2008 has been disclaimed.

[21] Appl. No.: 808,737

[22] Filed: Dec. 17, 1991

Related U.S. Application Data

[60] Division of Ser. No. 494,392, Mar. 16, 1990, Pat. No. 5,104,711, which is a continuation-in-part of Ser. No. 438,732, Nov. 17, 1989, Pat. No. 5,028,350.

[51] Int. Cl.[5] .......... C08L 5/00

[52] U.S. Cl. .......... 106/208; 252/88; 106/2; 106/311

[58] Field of Search .......... 252/88; 106/2, 311, 106/208

[56] References Cited

U.S. PATENT DOCUMENTS

| | | | |
|---|---|---|---|
| 312,694 | 8/1984 | Babington | 106/2 |
| 1,795,455 | 3/1931 | Vaughn | 106/137 |
| 1,861,165 | 5/1932 | Ryan | 106/2 |
| 2,120,569 | 11/1935 | Oliver | 106/2 |
| 2,306,887 | 3/1938 | Klose | 106/2 |
| 2,362,964 | 8/1940 | Affleck | 106/2 |
| 2,372,982 | 4/1945 | Richards et al. | 422/155 |
| 2,467,436 | 4/1949 | Lanning | 524/733 |
| 2,664,365 | 12/1953 | La Piana et al. | 427/218 |
| 2,816,326 | 12/1957 | Watts | 24/121.8 |
| 3,492,258 | 1/1970 | Kremer | 524/272 |
| 3,531,311 | 9/1970 | Prior | 427/154 |
| 3,821,147 | 6/1974 | Dickson | 252/8.6 X |
| 3,846,172 | 11/1974 | Fossati | 134/4 |
| 3,899,437 | 8/1975 | Regan et al. | 352/106 |
| 4,055,441 | 10/1977 | Taylor et al. | 134/10 |
| 4,089,804 | 5/1978 | Falk | 252/355 |
| 4,315,779 | 2/1982 | Heyd et al. | 106/5 |
| 4,347,266 | 8/1982 | Norman et al. | 427/154 |
| 4,578,407 | 3/1986 | Amabile et al. | 524/55 |
| 4,634,607 | 1/1987 | Ernsberger | 427/282 |
| 4,643,840 | 2/1987 | Brocklehurst et al. | 252/160 |
| 4,801,635 | 1/1989 | Zinkan | 252/88 |
| 5,028,350 | 7/1991 | Marsek | 252/88 |

FOREIGN PATENT DOCUMENTS

| | | |
|---|---|---|
| 1913588 | 11/1969 | Fed. Rep. of Germany . |
| 2728464 | 5/1978 | Fed. Rep. of Germany . |
| 2746502 | 6/1978 | Fed. Rep. of Germany . |
| 345820 | 5/1960 | Sweden . |
| 903675 | 8/1962 | United Kingdom . |

OTHER PUBLICATIONS

*Hawley's Condensed Chemical Dictionary,* Van Horticon Runhold Company, New York, 1987 p. 1241.

*Primary Examiner*—David Brunsman

*Attorney, Agent, or Firm*—Kinzer, Plyer, Dorn, McEachran & Jambor

[57] ABSTRACT

A masking system including a water soluble liquid masking composition to be spray-applied in film form to a limited area of a configured surface having a contiguous area to be coated for suppressing dust in the limited area and to prevent dust from migrating to and marring the quality of the coating, comprising an aliphatic polyhydroxy liquid carrier in which are dispersed a thickener and surfactant, the viscosity of the film being such that it remains substantially continuous on a vertical panel.

1 Claim, 2 Drawing Sheets

LIQUID SPRAY MASK AND METHOD

This application is a division of application Ser. No. 07/494,392, filed Mar. 16, 1990 now U.S. Pat. No. 5,104,711, which is a continuation-in-part of application Ser. No. 07/438,732 filed Nov. 17, 1989, now U.S. Pat. No. 5,028,350.

FIELD OF THE INVENTION

This invention relates to a method of masking the body of a (or other configured surface) to settle dust and protect an undamaged area against overspraying, during body shop painting for instance. The invention also relates to a liquid spray mask composition used to settle the dust.

BACKGROUND OF THE INVENTION

Modern automobile refinishing frequently involves partial repainting using factory-specification paints. Typically, an acrylic enamel or a two-part catalyzed urethane (enamel) paint is applied to a portion of the painted area of a vehicle. The ordinary masking or protecting procedure is to "paper mask" twelve to thirty-six inches of the area not to be painted. High quality shops will employ a plastic wrap or "bag" applied to the remaining area not to be painted because the paper mask does not always seal sufficiently well to prevent paint overspray from reaching the protected area, nor dirt and moisture from reaching the fresh paint. Overspray from these or other modern automotive paints sticks tenaciously (especially to glass and bright metal), and its removal is very tedious. Airborne dirt or moisture escaping from the bag can settle on the wet paint, causing a pebbly appearance or mottled finish which can be thoroughly objectionable to the fastidious customer. Following repainting, the bag when used is ordinarily thrown away, resulting in extra shop waste. Despite these shortcomings, plastic bag masking is currently used, especially by quality shops.

Regardless of the procedure used, in the typical process the paper is cut away carefully around the area to be refinished and taped into place at the perimeter of that area The plastic is also taped down.

From time to time, and especially in the early days of automobile refinishing, various water-washable liquid masking compositions have been proposed. Among these are the compositions of U.S. Pat. Nos. 1,795,455, 1,861,165, 3,846,172, 4,347,266 and 4,548,967 and PCT application No. W088/101156.

Although unrelated to paint masking, it should be noted that U.S. Pat. No. 4,315,779 discloses denture gel compositions containing glycerin (also known as glycerol), xanthan gum and other ingredients.

SUMMARY OF THE INVENTION

Liquid masking compositions tend to fail due to factors such as inadequate film integrity, sag, insufficient tackiness to trap dust adventitiously afloat in the shop during painting and susceptibility to paint solvent bleed-through. These problems can be especially severe with the modern automotive paints mentioned above, and are particularly noticeable at the perimeter of a refinished area where the highest overspray velocity and concentration occur. The present invention addresses these problems by combining two masking techniques. In one aspect, the present invention provides a method for masking a protected portion of a vehicle (or other configured surface) so that a desired coating can be applied to the unmasked portion of the vehicle or other configured surface. The configured surface to be painted or otherwise coated or decorated has two portions, an unprotected first portion or area to be coated which may also be termed the unmasked area, and a protected second portion or area not to be coated, which may also be termed the coated area. The masked (protected) area can also be termed the external or surrounding portion, and the internal (paintable) area termed the contiguous portion.

More specifically, an aspect of the present invention provides a method comprising the steps of:

(a) separating the two portions by surrounding at least a part of the perimeter of the first portion with an edging means in the form of a thin flexible barrier strip adherent to the hereafter-specified masking solution;

(b) applying to at least a part of the second portion, adjacent the barrier strip, a water soluble masking solution comprising a mixture of (i) a water soluble aliphatic polyhydroxy liquid carrier, (ii) a water soluble thickener; and (iii) water;

(c) pressing the barrier strip against or on to the masking solution to produce a guarding edge;

(d) applying the coating to the first portion adjacent the guarding edge;

(e) drying the coating;

(f) removing the edging means and washing off the masking solution, whereby the masking solution inhibits dust on the second portion from marring the coating and protects the second portion against coating overspray.

In somewhat different terms, an aspect of the present invention is characterized by the steps of:

(a) separating the portions by surrounding at least part of the perimeter of the first portion with an edging means in the form of a thin flexible barrier strip;

(b) applying to at least a part of the second portion adjacent the barrier strip, a water soluble masking solution containing a thickener which renders the masking solution tacky and imparts to the masking solution a viscosity such that the masking solution maintains a substantially continuous film on a vertical surface;

(c) bending the barrier strip toward the masking solution to produce a guarding edge;

(d) applying the coating to the first portion adjacent the guarding edge while the masking solution remains tacky;

(e) drying the coating;

(f) removing the edging means and washing off the masking solution, whereby the masking solution inhibits dust from marring the coating, captures floating dust and prevents bleed-through of any coating which may escape to the second portion.

The washing step is preferably applied to both areas. The edging means provides an effective upright guard separating the protected and unprotected areas during application of the masking solution. The guard when subsequently folded back presents a guarding edge augmenting the masking effectiveness of the liquid mask. The liquid masking solution provides low-cost, rapid application, effective large-area masking, and dust suppression so that dust atop the protected area is less likely to mar the freshly coated area.

The invention also provides a liquid masking solution to be spray-applied in film form to a limited area of a configured surface having a contiguous area to be coated, the masking composition suppressing dust in the limited area to prevent such dust from migrating to and marring the quality of the coating in the contiguous area, said composition comprising an aliphatic polyhydroxy liquid carrier in which are dispersed a thickener and surfactant, the surfactant aiding wetting and spreading of the masking liquid when applied and effective to produce sudsing of the film for easy removal by a water wash after the coating has dried, and the viscosity of the film being such that it will maintain a substantially continuous film on a vertical panel.

More specifically, the invention provides a preferred liquid masking solution comprising:

a) water, preferably about 70–75 weight percent, b) glycerol as the carrier, preferably about 10–30 weight percent, c) xanthan gum as the thickener, preferably about 0.05 to 5 weight percent, and d) a selected surfactant, preferably about 0.05 to 5 weight percent.

The amounts of the above ingredients are sufficient in the preferred form to provide a sag-resistant, overspray-resistant, water-removable, slightly tacky mask film when the solution is sprayed upon the undamaged portion of a vehicle.

DETAILED DESCRIPTION

Figure 1:
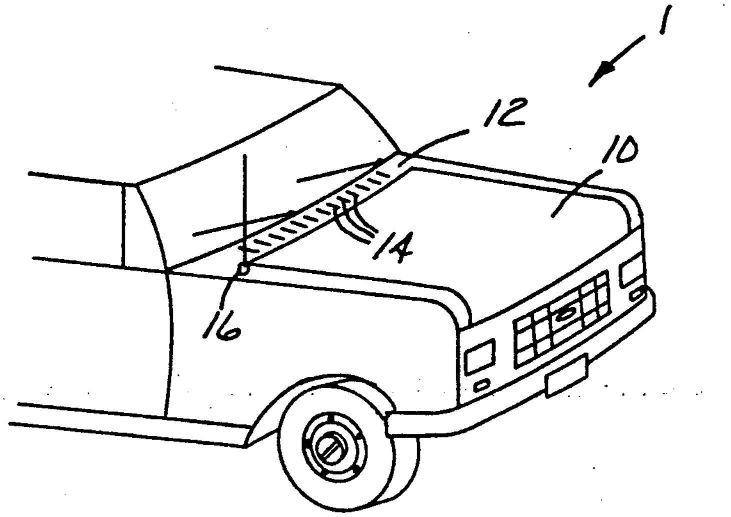
FIG. 1 is a perspective view of an automobile that will be refinished.

The masking method is shown in the drawing where FIG. 1 shows a perspective view of an automobile 1 whose hood 10 has been repaired but not yet refinished by spray painting following minor crash damage. Surrounding (exterior) area 12 includes cowl vent louvers 14, radio antenna 16, and several difficult-to-mask areas on the remainder of vehicle 1. Surrounding area 12 was undamaged and does not need to be repainted.

Accordingly, the surrounding background or protected area 12 and other exposed portions of vehicle 1 will be masked using the present invention, so that the contiguous area of the hood 10 can be spray coated with a factory-specification automotive paint.

Figure 2:
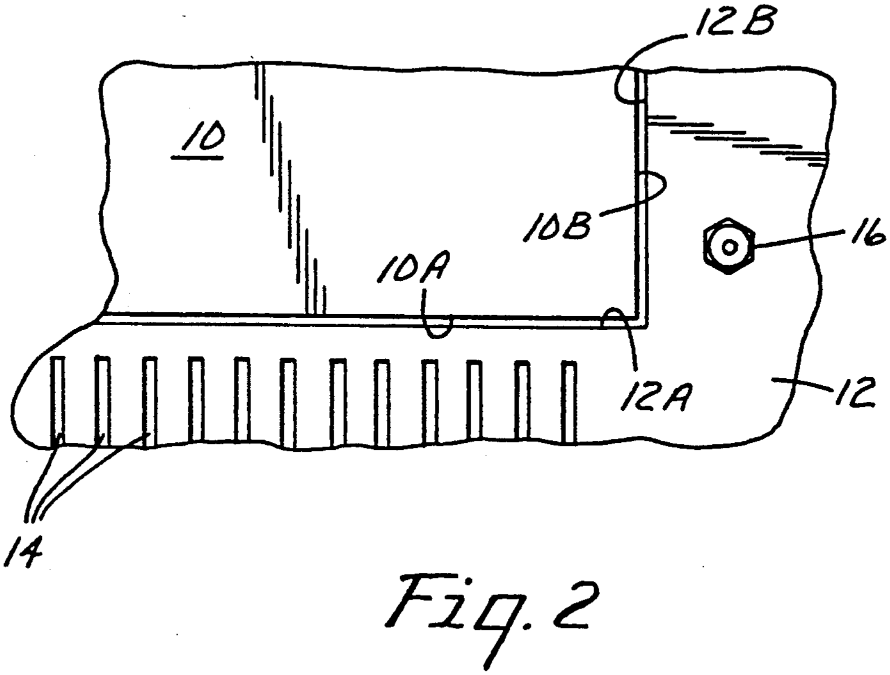
FIGS. 2 and 3 are schematic overhead views illustrating steps employed in the present invention.

FIG. 2 shows an overhead view of the right rear portion of hood 10. Edges 10A and 10B define the rear and right side, respectively, of hood 10, and together form part of its perimeter. The perimeter is surrounded by body seams including cowl edge 12A and fender edge 12B. For clarity, the body-to-fender seam that customarily would be present near the rear corner of hood 10 has been omitted.

Figure 3:
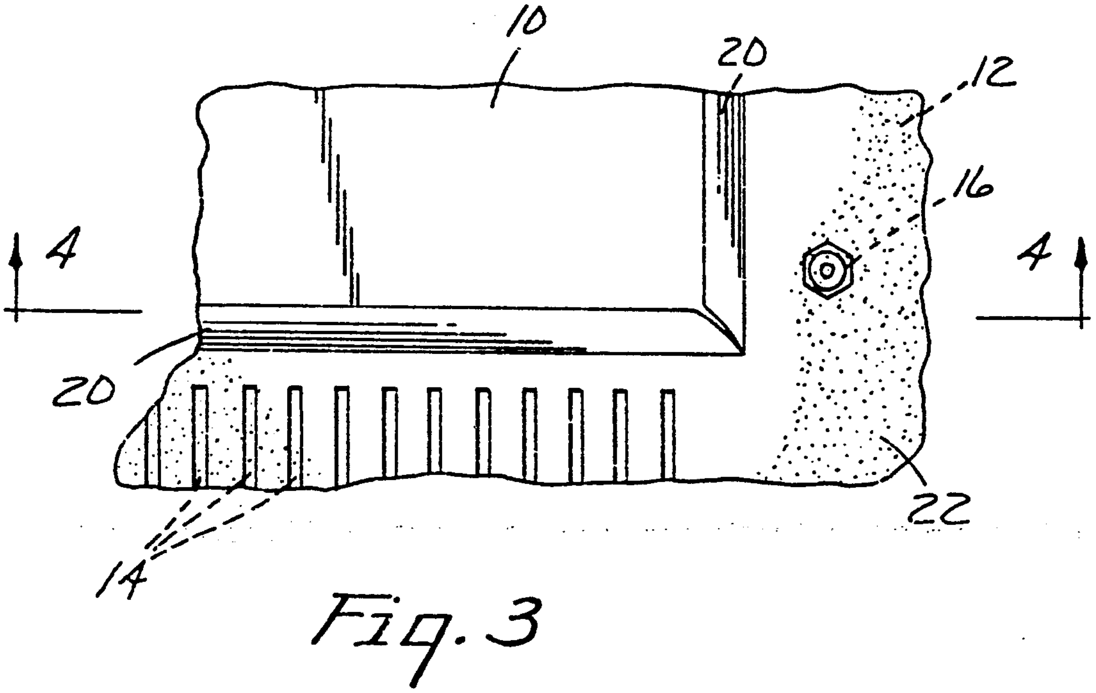
Figure 4:
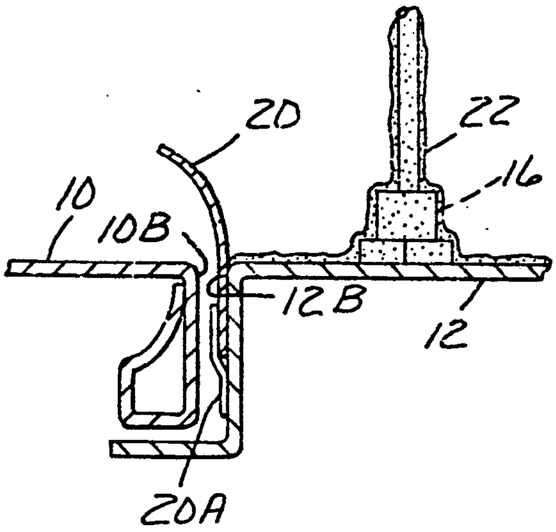
FIGS. 4 and 5 are cross-sectional views along line 4—4 of FIG. 3, further illustrating steps employed in the present invention.

As shown in FIGS. 3 and 4, the right rear portion of the perimeter of hood 10 has been surrounded with a strip of free-standing or upright masking paper 20, secured by a strip of adhesive tape 20A to edges 12A and 12B. Masking paper 20 has been preferably folded slightly inward toward hood 10 to guard the hood 10 against ingress of the masking solution when it is being sprayed on to the protected area. The protected area 12 of the vehicle has been spray-coated (using an airless spray gun) with a masking solution of the present invention, resulting in formation of an essentially continuous masking film 22 that is tacky when dry. The masking solution is applied to area 12 up to the barrier edge represented by the face or side of the barrier strip opposed to the protected or masked area. In like manner, the paint is applied to the barrier strip. Although not shown, coating 22 also covers the windshield, backlight, side glass, grille, bumpers, wheel well arches, wheels, tires and, with the exception of hood 10, the other exposed portions of vehicle 1.

Figure 5:
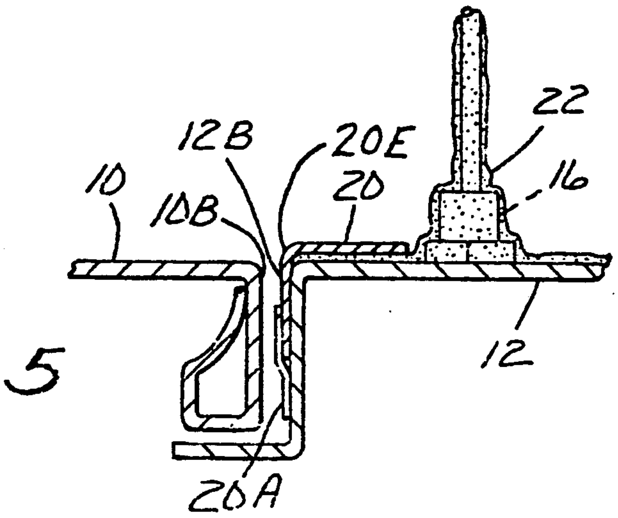

As shown in FIG. 5, following application of the sprayed mask, masking paper 20 has been folded or bent toward the protected area 12 and pressed against coating 22 so that the paper adheres to the coating. The paper thus folded and pressed presents a guarding edge 20E to assure a neat finished edge. Only a mild degree of adhesion is required, and surface tension effects will usually be sufficient. Preferably the degree of adhesion is sufficiently high to discourage or prevent the edging means from separating from the coating 22 when the vehicle is spray-painted.

Following the pressing step, several further steps (not shown in the drawing) are performed. Hood 10 is spray-painted with a two-part urethane enamel. After the freshly-applied paint film dries, masking paper 20, tape 20A and the paint atop them are removed manually. Coating 22 and any paint overspray atop it are removed using water from a garden hose or power washer. If desired, paper 20 and tape 20A can be removed after (instead of before) coating 22 is washed off. If the area to be coated includes a free edge (such as a rocker panel or fender), then such free edge of course need not be guarded by an edging means; hence the phrase "edged or surrounded at least in part," or equivalent phrase employed herein. Also, the external or outside area to be masked may be so large or so remote compared to the area to be coated that its entirety need not be always masked under the present invention; hence the expression "masked at least in part" or equivalent phrase employed herein.

The method of the present invention enables a vehicle to be masked without having to pre-wash the vehicle. A pre-wash is often employed before conventional masking with a plastic bag or masking paper in order to improve masking paper adhesion and reduce the likelihood that dust will escape from inside the bag or from under the masking paper, thereby marring the finish. The masking solution can be applied to a vehicle as soon as it is brought to a shop, and then left on the vehicle until refinishing has been completed. Meanwhile the vehicle can be driven in and out of the spray booth (if a side window is rolled down or a suitable portion of the windshield is wiped clean), parked outside (so long as it does not rain) and left alongside vehicles undergoing sanding or other work-in-progress without harm. The use of masking paper and masking tape is reduced to a minimum.

If perchance some of the masking solution does get into the area to be painted, it is easily wiped off with a clean, damp cloth. Minor defects or deliberately-removed areas of the coating 22 can be readily spot-repaired using a sprayer or brush.

The masking solution of the present invention is not expensive, since it is mostly water; it can be composed entirely of food-grade ingredients, and thus is relatively safe and non-toxic.

The preferred ingredients of the masking solution (described in more detail below) are readily biodegradable and should have minimal adverse environmental consequences. The masking solution resists post-paint baking temperatures as high as 94° C. in those shops using a baking booth, that is, the masking solution does not undergo thermal breakdown or distintegration during the post-paint bake.

The masking solution can be removed with the normal finish-up wash, and if it contains the above-mentioned surfactant, will assist the finish-up wash by forming suds. The completed vehicle can thus be made customer-ready with minimal additional effort with no need manually to remove accidental paint overspray.

In an actual test performance at a quality body shop involving an automobile (Audi 5000) ® damaged along the length of one side, one-half of the vehicle to be painted and one-half to be protected, the total time of preparation by the paper wrap and plastic bag method was 6.3 hours at a labor cost of $56.70, reduced to one and one-half hours at a labor cost of $13.50 under the present invention. This shop did not jobcost materials.

The procedure included (1) the standard car prewash, (2) "prep" time, and (3) clean up. Step (1) was eliminated under the present invention, step (2) required one-half hour instead of two hours, and step (3) was reduced from four hours to one hour. Not only was masking labor time saved, but the paint job undertaken when using the masking method of the invention required less post-paint watersanding and buffing because little or no dirt had to be removed from the finish coat. The time saving is so substantial that a body shop can mask the wheel well arches, door jambs and engine components at no extra charge to the customer.

In a second test on a Mercury Sable ® automobile at a quality shop in which one-fourth of the vehicle needed repainting (header panel, hood, one fender and one door), 4.75 hours were required for the paper wrap/plastic bag method compared to 1.5 hours using the method of the invention. The related time and materials costs were $68.50 vs. $25.50.

Specifically, the time and materials costs involving these two jobs were as follows:

| Routine | Current Method | Present Invention |
|---|---|---|
| | Audi 5000 ® | |
| Wash car before masking | 0.30 hrs | Not required |
| Prep for paint | 2.00 hrs | .5 hrs |
| Watersand, buff and clean up | 4.00 hrs | 1.0 hrs |
| Total hours (76% savings) | 6.30 hrs | 1.5 hrs |
| Labor cost @ hourly rate of $9.00 | $56.70 | $13.50 |
| Materials | | |
| Not jobcosted | | |
| Total Labor Cost | $56.70 | $13.50 |
| | Mercury Sable ® | |
| Wash car before masking | 0.25 hrs | Not required |
| Prep for paint | 1.50 hrs | 0.5 hrs |
| Watersand, buff and clean up | 3.00 hrs | 1.0 hrs |
| Total hours (68% savings) | 4.75 hrs | 1.5 hrs |
| Labor cost @ hourly rate of $10.00 | $47.50 | $15.00 |
| Materials | | |
| Masking tape | $8.00 | $3.00 |
| Masking paper | 6.50 | 2.00 |
| Plastic wrap & wheel covers | 4.00 | Not required |
| Soap | 2.50 | Not required |
| Present masking solution | Not used | 5.50 |
| Total materials cost | $21.00 | $10.50 |
| Total Labor/Materials | $68.50 | 25.50 |

-continued

| Routine | Current Method | Present Invention |
|---|---|---|
| Cost | | |

The edging means employed in the present invention preferably is a relatively narrow paper-backed or plastic-backed adhesive-bearing strip that can be wrapped around compound or convex curves and easily folded against the masking solution. Masking paper (for example, "SCOTCH" masking paper, 3M), or plastic-coated masking paper (for example "SCOTCHBLOK" masking paper, 3M) can be used. Plastic-coated masking paper is preferred because the plastic coating permits the paper to retain its wet strength even after being pressed into the wet masking solution. Ordinary masking tape can be used if desired. These papers or tapes are well known of course and are referred to herein as a thin, flexible guard or barrier mask strip. The flexible barrier strip preferably has a width less than about 400 mm, more preferably less than about 200 mm, and a thickness less than about 0.127 mm, more preferably less than about 0.025 mm. A good dimension range for the barrier strip is a width of about 150 to about 300 mm and a thickness of about 0.02 to about 0.125 mm.

As mentioned above, the masking solution contains water, aliphatic polyhydroxy compound, thickener, and optional surfactant. It can contain further optional ingredients as will be disclosed. The water preferably is distilled or deionized water, although tap water can be used if desired. If water with significant ionic content is employed, then it is desirable to include a sequestering agent such as the tetrasodium salt of ethylenediaminetetraacetic acid (EDTA), sodium metaphosphate, aminopolycarboxylic acids, inorganic polyphosphates, polyacrylates and organophosphorus compounds or mixtures thereof. The sequestering agent serves as a water softener, chelating agent, or metal ion deactivator, thus preventing the formation of insoluble soap or scale. If the available tap water is sufficiently "soft", a sequestering agent may be unnecessary. Thus, for purposes of commercial production, it is a matter of determining the quality of the local water and sequestering it, or not, accordingly.

The amount of water should be sufficient to impart to the masking solution the desired spraying and spreading properties. This amount can vary depending on factors such as the ambient shop temperature, ambient shop humidity, and the types and amounts of the other ingredients in the masking solution.

The amount of water should be maximized for economic reasons, and as a general guide should be at least about 70 weight percent, more preferably at least about 75 weight percent based on the total masking solution weight. Lower amounts can be used if desired, particularly in concentrates intended to be diluted before use.

The aliphatic polyhydroxy compound is a water-soluble liquid carrier or dispersant for the remaining ingredients in the masking solution miscible therein. It should be of such nature as to prevent solvent overspray from penetrating the masking film. It preferably is non-toxic and odorless, and should provide good dust film penetration and a substantially continuous masking solution film when the masking solution is sprayed on a vehicle. The aliphatic polyhydroxy compound preferably has a high boiling point (e.g. 82° C. or more) in order to prevent rapid drying during application, thereby imparting desirable wetting properties and penetration of the solution into nooks and crannies. Glycerol is preferred; it does not stain or streak the paint, it is easily removed during the post water wash, it effectively prevents paint solvent overspray from penetrating the masking film, and is not adversely affected by high temperatures. Glycerol can be diluted with ethylene glycol, propylene glycol and 1,3 propanediol; but these alcohols tend to cause streaking of fresh paint and hence must be employed with this limitation in mind.

The amount of aliphatic polyhydroxy compound should be sufficient when combined with the water to enable the masking solution to form a substantially continuous film. Increased amounts will increase film thickness, film spreading, overspray resistance (for example, resistance to bleed-through by conventional vehicular coatings), and drying time. As a general guide, the amount of aliphatic polyhydroxy compound should be about 10 to about 30 weight percent, more preferably about 15 to about 25 weight percent, and most preferably about 19 to 20 weight percent based on the total masking solution.

The thickener is a water-soluble, film-forming material that imparts a non-bleeding character and sag-resistance to the film. Preferably the thickener is such that it also permits the film to remain in a tacky state after application in order to trap adventitious dust. Preferred thickeners are polysaccharides, such as hydroxyethyl cellulose (for example, "NATROSAL" from Aqualon Co., and "CELLOSIZE" from Union Carbide Corp.), hydroxypropyl cellulose (for example, "KLUCEL" from Aqualon Co.), hydroxypropyl methyl cellulose (for example, "METHOCEL" from Dow Chemical Co.), sodium carboxymethyl cellulose (for example, "NATROSAL" and "KLUCEL" from Aqualon Co.), galactomannan (for example, "PROGACYL" and "AVG" from the Lyndal Division of Colloids, Inc.), guar gums (for example those supplied by Meer Corp.), agar, algin, carrageenan, plant gum exudates (for example, gum arabic, gum tragacanth and karaya gum), locust bean gum, pectin, and microbial polysaccharides (for example, dextran, xanthan gum and welan gum). Mixtures of thickeners can be used if desired. Xanthan gum is a particularly preferred thickener available as "KELZAN S" from Kelco Division of Merck & Company. Xanthan gum imparts to the masking solution particularly good shear thinning properties, superior sag-resistance, and enhanced resistance to paint bleed-through.

The amount of thickener should be sufficient to enable the masking solution to maintain a slightly tacky and sag-resistant, overspray-resistant, continuous film when applied to a clean, painted vertical metal panel at ordinary spray booth temperatures (for example at temperatures up to about 50° C.). As a general guide, the amount of thickener preferably is about 0.05 to about 5 weight percent, more preferably about 0.5 to about 1.5 weight percent, and most preferably about 0.8 to about 1 weight percent based on the total masking solution weight. It should be noted that at higher water content more thickener and carrier should be used.

The optional but preferred surfactant promotes film wetting and spreading, and preferably forms soap suds when the masking solution is washed off with water. Since the amount of surfactant required for sudsing is small, there are literally scores of surfactants that can be used as long as the surfactant does not lead to staining during the paint bake. With resistance to staining as the guide, the preferred surfactant is sodium alpha-olefin sulfonate. Mixtures of surfactants can be used if desired.

The amount of surfactant need only be sufficient to provide good sudsing and easy removal by washing in the event the masking solution reaches the area to be painted. As a general guide, the amount of surfactant preferably is about 0.05 to 5 weight percent, more preferably about 0.5 to 1.5 weight percent, and most preferably about 0.8 to about 1 weight percent based on the total masking solution.

The masking solution also optionally contains a small amount of a water-soluble biocide to discourage microbial-induced degradation of the solution during storage. Generally, biocides include chlorinated hydrocarbons, phenolics, quaternary ammonium compounds, organic sulfur compounds, metallic salts, organometallic compounds and halogen-releasing compounds. Suitable biocides, by no means a complete list, include:

TABLE A

1. "COSAN 91" of Cosan Chemical Corporation which is 2-[(hydroxymethyl) amino] ethanol;
2. "DOWICIDE A" Antimicrobial, which is sodium o-phenylphenate available from Dow Chemical Company;
3. "KATHON LX" and "KATHON LX 1.5%", supplied by Rohm & Haas Company which are, respectively, 5-chloro-2-methyl-4-isothiazolin-3-one and 2-methyl-4-isothiazolin-3-one;
4. The "TROYSAN"-brand biocides of Troy Chemical Company including:
   (a) "142" which is 3,5-dimethyltetrahydro 1,3,5,2H-thiadiazine-2-thione;
   (b) "174" which is 2[(hydroxymethyl)-amino] ethanol;
   (c) "190" which is 2-[(hydroxymethyl)amino]-2-methyl-1-propanol;
   (d) "192"which is 2-[(hydroxthyl-amino]-2-methylpropanol;
   (e) "PMA-100" which is phenyl mercury acetate;
   (f) "PMA-30" which is solubilized phenyl mercury acetate;
   (g) "PMDS-10" which is di(phenyl mercury) dodecenyl succinate;
   (h) "POLYPHASE" which is 3-Iodo-2-propynyl butl carbamate;
   (i) "CMP" acetate which is chloromethoxypropyl mercuric acetate;
   (j) "Copper 8" which is copper napthanate;
   (k) "Anti-Mildew O" which is N-(trichloromethylthio) phthalimide; and
   (l) "PMO-30" which is phenyl mercury oleate.

The amount of biocide should be sufficient to discourage degradation during a storage period of more than a year at temperatures up to about 38° C. A preferred amount of biocide is about 0.05 to about 0.5 weight percent, and more preferably about 0.1 to about 0.2 weight percent, based on the total weight of the masking solution.

Other adjuvants that can be included in the masking solution include pigments, dyes, indicators, pH buffers, extending fillers, and defoamers.

The ingredients in the masking solution can be mixed in any convenient order. For solutions made from a solid thickener, a preferred mixing method involves pulverizing the thickener (or preferably employed a finely-divided thickener that has been stirred to break up lumps), and blending the aliphatic polyhydroxy compound and thickener to wet out the solid. The water and other ingredients are then added using slow agitation. Because the thickener will tend to increase the viscosity of the mixture over time, the mixer speed is preferably increased to counteract any viscosity increase. The surfactant is usually added last. The final solution should be mixed until well blended, for example, for about one to one and one-half hours.

Any convenient mixing equipment can be employed. A "LIGHTNIN" mixer from Mixing Equipment Co., Chicago, Ill., has been found to work well.

The masking solution preferably has a sufficiently low viscosity to enable it to be applied using an atomizing spray nozzle, for example an airless sprayer; the viscosity is preferably less than about 2,000 centipoise, measured as described for EXAMPLE 1.

Application of the masking solution can be made using gravity, air-powered or airless spray equipment, rollers, brushes, rags, or any other technique that will apply a sufficiently thick coating to the surface to be protected. An atomizing spray head application is preferred, applying a quantity which produces the appearance of a no-sagging film just starting to run, experience being the best teacher in this trade as in others. A model AL2307 airless sprayer from Campbell Hausfeld has been found to give very good results. Other sprayers utilizing an atomizing spray head which can be used are the so-called "12:1 transfer pump" incorporating a high pressure hose and an airless spray gun, pressure pot sprayers and "HVLP" (high volume, low pressure) sprayers.

EXAMPLE 1

A particularly preferred sequestered masking solution formulation of the present invention is as follows:

| Ingredient | Weight Percent |
|---|---|
| Water | 77.73 |
| Glycerol (96%) | 20.11 |
| Xanthan gum ("KELZAN S") | 0.79 |
| Sodium alpha-olefin sulfonate (SAS) | 0.73 |
| EDTA | 0.64 |
| | 100.00 |

This solution has a specific gravity of about 1.053 at 25° C., a density of about 1.05 g/cc, a pH of about 6.4, and a viscosity of about 1900 cps, measured using a "BROOKFIELD" viscometer equipped with spindle no. 2 and operated at 20 revolutions per minute at 25° C.

EXAMPLE 2

An unsequestered masking solution of the present invention is as follows:

| Ingredient | Weight Percent |
|---|---|
| Water | 78.23 |
| Glycerol (96%) | 20.24 |
| Xanthan gum ("KELZAN S") | 20.24 |
| SAS | 0.73 |
| | 100.00 |

The specific gravity, density, pH and viscosity of this solution are substantially the same as those of EXAMPLE 1.

It was mentioned above that concentrates can be supplied. Based on EXAMPLES 1 and 2, a good concentrate would comprise glycerol and xanthan gum in 20:1 weight ratio.

The preferred masking solution can be applied to almost any surface, including cured paint, glass, cloth, vinyl, rubber, plastic, stainless steel and chrome. It is easily removed (for example, by wiping with a damp cloth) if accidentally applied to the unmasked area. Once applied, the solution remains slightly tacky, thus trapping airborne dust. The tacky state prevails for a prolonged period, at least one week or more, and consequently affords ample time in which to undertake the paint job. The prolonged tacky state is advantageous for a shop confronted with a sudden or unexpected multitude of repair jobs.

The solution will protect against overspray from common vehicle coatings such as lacquer, enamel, urethane, anti-chipping, and anti-corrosion coatings. The solution will be applied in most instances to an automobile, but can also be applied to trucks and trailers, boat hulls, aircraft fuselages and other configured surfaces. If desired, it can be used to mask walls and other immobile configured surfaces, including paint booth walls and floors.

Hence, while I have described preferred ingredients and their preferred proportions, and preferred materials and dimensions for the barrier strip, it should be understood that these have been combined for superior performance, and are capable of variation. Accordingly, my invention should not be limited to the illustrative embodiments described in this specification.

I claim:

1. A masking system including a water soluble liquid masking composition to be spray-applied in film form to a limited area of a configured surface having a contiguous area to be coated, the masking composition suppressing dust in the limited area to prevent such dust from migrating to and marring the quality of the coating in the contiguous area, said composition comprising about 10 to about 30 weight percent glycerol as an aliphatic polyhydroxy liquid carrier in which are dispersed about 0.05 to about 5 weight percent surfactant and about 0.05 to about 5 weight percent xanthan gum as a thickner, balance substantially water, the surfactant aiding wetting and spreading of the masking liquid when applied and effective to produce sudsing of the film for easy removal by a water wash after the coating has dried, and the viscosity of the film being such that it remains substantially continuous on a vertical panel.

* * * * *